United States Patent Office 3,454,643
Patented July 8, 1969

---

3,454,643
5 - (TERTIARYAMINOALKYLENE)-5 HYDROXY- AND 5-(TERTIARY AMINO-ALKYLIDENE) - DIBENZOCYCLOHEPTATRIENES, AND SALTS THEREOF
Arthur C. Cope, Belmont, Mass., and Edward L. Engelhardt, Gwynedd Valley, Pa.; Katheryn Keene, executrix of the estate of Arthur C. Cope, deceased, and said Engelhardt, assignors to Merck & Co., Inc., Rahway, N.J., a corporation of New Jersey
No Drawing. Continuation-in-part of application Ser. No. 731,136, Apr. 28, 1958. This application Apr. 27, 1959, Ser. No. 808,943
Int. Cl. C07c 87/28; C07d 27/22, 87/28
U.S. Cl. 260—570.8     7 Claims This application is a continuation-in-part of an earlier application Ser. No. 731,136 filed on Apr. 28, 1958, now abandoned.

This invention relates to derivatives of dibenzo[a,e] cycloheptatrienes and particularly to those having the structures:

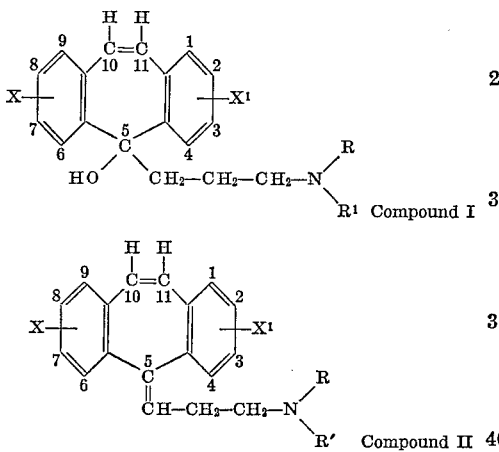

in which

is a tertiary amino group and particularly one selected from di-lower-alkylamino in which the alkyl radicals have up to four carbon atoms each, 1-piperidyl, 1-pyrrolidyl, 4-morpholinyl, and 1-lower alkyl-4-piperazinyl the alkyl moiety of which has up to four carbon atoms. The radicals X and $X^1$ may be hydrogen or a halogen which particularly is chlorine, bromine or fluorine, but X and $X^1$ may as well be radicals such as trifluoromethyl, lower alkyl having up to four carbon atoms, lower alkoxy having up to four carbon atoms, or a mononuclear aryl radical such as phenyl. The radicals X and $X^1$ may be similar or may be dissimilar and each benzene ring may have one or two of the aforementioned radicals attached to it.

The trimethylene side chain may have one or more of its hydrogens replaced by a lower alkyl group provided the total number of carbons in all such alkyl groups does not exceed four in number. When one or more of the side chain hydrogens is substituted by an alkyl group, one of the alkyl substituents can be linked with $R^1$ to form a heterocyclic ring including the nitrogen atom.

The compounds represented by the structure I are useful as intermediates and may be sold commercially for making the corresponding compound with structure II. The compounds of structure II are useful as psychomotor depresents. The compound 5-(3-dimethylaminopropylidene)-dibenzo[a,e]cycloheptatriene has been found to be particularly effective for this purpose.

As psychomotor depressants, the compounds have been found to be particularly useful as a veterinary medicine to quiet or tranquilize animals. Animals which are being shipped may be given the medicine to overcome nervousness and thus avoid the loss of weight and sickness which frequently occur. The compound may be administered before shipment but if it is undesirable that some of them lie down during transit, it may be administered at the time of unloading with advantageous results. In either instance the animals will consume food and water sooner after transit.

In like manner it is worthwhile to administer the medicine before branding, dehorning and castrating because the animals are quieter and they are less likely to get hurt due to thrashing about. If the animals are to be sorted they may be given the medicine to overcome the excitement which the sorting ordinarily induces. This is also true of animals which are being weaned.

It is best to inject the compound intramuscularly or intravenously to accurately measure the dose, but it may be given in the feed or drinking water, or be given as a bolus. When injected intramuscularly or intravenously, best results are obtained with from 0.25 to 1 milligram per pound of body weight, although somewhat lower or higher amounts may be administered. The compounds have also been found to be useful in human therapy because of their calming effect.

For injection purposes, 5% to 10% sterile aqueous solution may be prepared of the compound. The compounds are most easily administered as a salt and any convenient, nontoxic acid may be used for this purpose and these salts are considered to be equivalent to the bases.

To prepare the compounds of the invention, the known compound dibenzo[a,e]cycloheptatriene-5-one is used as a starting material. This may be prepared by using the process described by A. C. Cope et al., entitled, Cyclic Polyolefins, XIV, 3,7-Dibromo-1,2:5,6-Dibenzcyclooctadiene and 1,2:5,6-Dibenzcyclooctatetraene, appearing in J.A.C.S., 73, 1668–1673 (1951). Or the starting compounds and particularly those those having substituents on the benzene rings may be made by following the teachings of T. W. Campbell et al., in an article entitled Synthesis of 2'-Acetamido-2,3:6,7-Dibenzotropilidene and 2-Acetamido - 9,9 - Dimethylfluorene, appearing in Helv. Chim. Acta, 36, 1489–1499 (1953).

The selected dibenzo[a,e]cycloheptatriene-5-one is reacted with a Grignard reagent to produce the compound I. The Grignard reagent may in some instances, be prepared by known procedures but it has been found that it may be prepared conveniently and in high yield as follows:

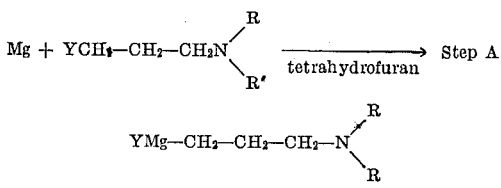

It has been found that the use of tetrahydrofuran as the solvent for the reaction results in a rapid production of the Grignard reagent and in high yield. The radical Y may be iodine or bromine but preferably is chlorine, and R and R' are the same as described above.

The Grignard reagent and the dibenzo[a,e]cycloheptatrieneone are combined according to the following equations:

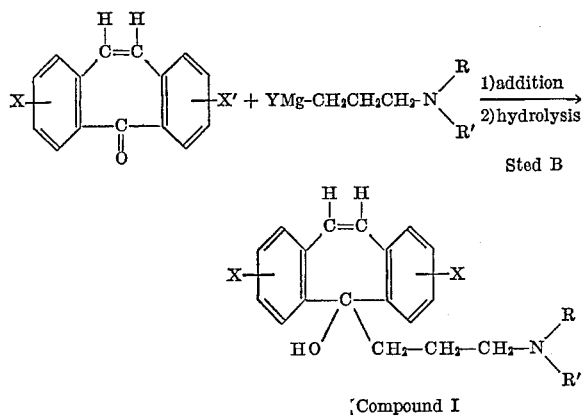

;Compound I

The reaction of Step B is preferably initially carried on under cooled condition such as by the use of an ice bath and finally may continue at room temperature. It has been found that tetrahydrofuran is an excellent solvent for carrying out the reaction of Step B and the source of this may be the product of Step A. The dibenzo[a,e]cycloheptatrieneone may be added directly to the reaction mixture in which the Grignard reagent was prepared. However, any inert solvent for the reactants of Step B may be employed. Hydrolysis to complete Step B is carried out in such way that strongly acidic conditions are avoided, and water alone may be sufficient.

After the reaction of Step B is completed the bulk of the solvent is removed by vacuum distillation. The Grignard adduct is dissolved in benzene and hydrolyzed by the addition of water or ammonium chloride solution with cooling. Compound I is recovered by evaporation of the benzene.

Compound I is dehydrated to produce Compound II, as is represented by the following:

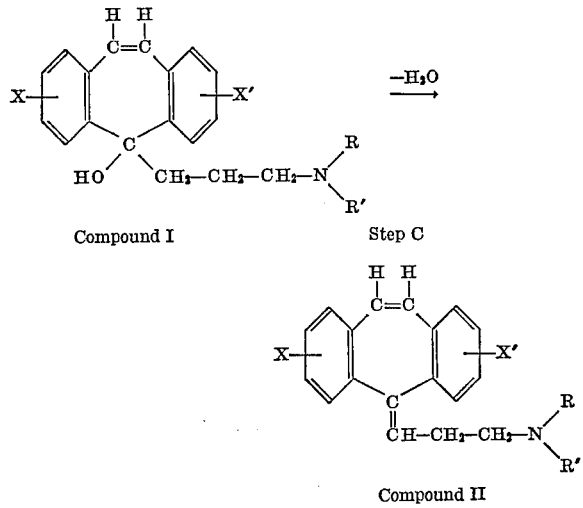

The dehydration of Compound I may be effected by means of such commonly used dehydrating agents as acetyl chloride, acetic anhydride or thionyl chloride. The alcohol may be dehydrated directly or may be first converted to a salt such as the hydrochloride, hydrobromide or sulfate. Conversion to the salt prior to dehydration is preferable in some cases. The reaction may be carried out in an excess of dehydrating agent as solvent, or employing a solvent such as chloroform or glacial acetic acid. The solvent is then removed by vacuum distillation and the Compound II is dissolved in a solvent from which it will crystallize, such as isopropyl alcohol.

If the two benzene rings of the nucleus are unsymmetrically substituted the compounds of the invention will generally be a mixture of geometric isomers. If they are separated they are hereinafter designated as α and β in the order of their isolation, and without reference to their configuration.

The following examples will serve to further clarify the invention.

EXAMPLE I 5-(3-dimethylaminopropylidene)-dibenzo[a,e]cycloheptatriene hydrochloride Step A: Preparation of 3-dimethylaminopropyl magnesium chloride.—Magnesium turnings (4.32 g., 0.178 g. atom) were placed in a 500 ml. 3-necked flask fitted with a stirrer, reflux condenser and a dropping funnel. The apparatus was flushed with dry nitrogen and provided with soda-lime filled drying tubes. The magnesium was covered with 20 ml. of dry tetrahydrofuran and a crystal of iodine added. The solution was heated to refluxing and 5 ml. of a 1.6 molar solution of 3-dimethylaminopropylmagnesium chloride in tetrahydrofuran was added. A solution of 21.6 g. (0.178 mole) of 3-dimethylaminopropyl chloride in 80 ml. of dry tetrahydrofuran was added dropwise with stirring at a rate such that reflux was maintained. When the addition was complete the solution was stirred under reflux for 1 hour.

Ethyl bromide may be used to initiate the reaction instead of the 3-dimethylaminopropylmagnesium chloride. The quantity employed is usually 5 to 10 percent of one molecular equivalent. The formation of the Grignard reagent between magnesium and ethyl bromide proceeds vigorously in tetrahydrofuran and only gentle heating is required to initiate this reaction.

Step B: Preparation of 5-(3-dimethylaminopropyl)-5-hydroxy dibenzo[a,e]cycloheptatriene.—The solution of 3-dimethylaminopropylmagnesium chloride prepared in Step A was cooled to 5 to 10° C. and stirred while 18.3 g. (0.0888 mole) of dibenzo[a,e]cycloheptatriene-5-one was added in portions over a period of 10 minutes. The reaction mixture was allowed to warm up to room temperature and stirred for 1 hour. The bulk of the solvent then was distilled at 40–50° C. under reduced pressure and benzene, 150 ml., was added to the residue. Water, 50 ml., then was added dropwise with stirring and cooling. The benzene layer was separated and the gelatinous residue extracted three times with 75 ml. portions of boiling benzene. The residue was treated with 50 ml. of water and collected on a filter mat of diatomaceous earth. After washing the filter cake with 50 ml. of benzene and extracting the aqueous layers with 50 ml. of benzene all benzene extracts were combined and evaporated on the steam-bath under reduced pressure. The crystalline residue, M.P. 134.3–135.3° C. weighed 25.8 g. (96%). Recrystallization from alcohol (3A anhydrous) gave 21.0 g. (81%) of product, M.P. 135.3–136.3° C., unchanged by further recrystallization.

Analysis.—Calcd. for $C_{20}H_{23}NO$: C, 81.87; H, 7.91; N, 4.78. Found: C, 81.98; H, 8.03; N, 4.76.

Step C: Preparation of 5-(3-dimethylaminopropylidene) - dibenzo[a,e]cycloheptatriene.—5 - (3 - dimethylaminopropyl)-5-hydroxydibenzo[a,e]cycloheptatriene, 6.0 g. (0.0204 mole) was dissolved in 27 ml. of chloroform and the solution saturated with dry hydrogen chloride while cooling. A white solid separated. Acetyl chloride, 4.80 g. (0.0612 mole) was added and the mixture heated to refluxing. The solid dissolved in the first 5 minutes. Refluxing was continued for 3 hours. The solvent was evaporated on the steam bath under reduced pressure and the residue crystallized from isopropyl alcohol. The white crystalline product M.P., 215.5–216.5° C. was obtained in a yield of 5.60 g. (88%). Recrystallization did not change the melting point.

Analysis.—Calcd. for $C_{20}H_{21}N \cdot HCl$: C, 77,02; H, 7.11; N, 4.49. Found: C, 76.98; H, 7.40; N, 4.47.

EXAMPLE II

α and β Isomers of 3-chloro-5-(3-dimethylaminopropylidene)-dibenzo[a,e]cycloheptatriene Step A: Preparation of 3-dimethylaminopropylmagnesium chloride.—The Grignard reagent was prepared from 18.3 g. (0.15 mole) of 3-dimethylaminopropyl chloride and 3.5 g. (0.15 g. atom) of magnesium following the method of Example I, Step A.

Step B: Preparation of 3-chlorodibenzo[a,e]cycloheptatriene - 5 - one.—3-chlorodibenzo[a,e]cycloheptatriene-5-one was prepared from phthalic anhydride and p-chlorophenylacetic acid following the sequence employed by A. C. Cope and S. W. Fenton, J. Am. Chem. Soc., 73, 1673 (1951) for the synthesis of the unsubstituted compound, except that the cyclization of 2-(p-chlorophenylethyl)-benzoic acid was effected by means of polyphosphoric acid following a modification of the method of T. W. Campbell, R. Ginsig and H. Schmid, Helv. Chim. Acta, 36 1489 (1953). The product melted at 109–110° C.

Step C: Preparation of 3-chloro-5-(3-dimethylaminopropyl)-5-hydroxydibenzo[a,e]cycloheptatriene.—To the solution obtained in Step A was added 18.05 g. (0.075 mole) of 3-chlorodibenzo[a,e]cycloheptatriene - 5 - one (obtained by Step B) under the conditions described in Example I, Step B. The product, 3-chloro-5-(3-dimethylaminopropyl) - 5 - hydroxydibenzo[a,e]cycloheptatriene was obtained as a crystalline solid, M.P. 135.5–138° C. in a yield of 99%. Crystallization from hexane gave a product composed of two crystal forms: clusters of needles, M.P. 133–135.5° C. and prisms, M.P. 137.5–138.5° C. The mixed M.P. when heated slowly was 137–138° C. After drying a sample for analysis it melted at 137.3–138.3° C.

Analysis.—Calcd. for $C_{20}H_{22}ClNO$: C, 73.29; H, 6.77; N, 4.27. Found: C, 73.46; H, 6.76; N, 4.26.

Step D: Preparation of 3-chloro-5-(3-dimethylaminopropylidene)-dibenzo[a,e]cycloheptatriene. — A solution of 6.56 g. (0.02 mole) of 3-chloro-5-(3-dimethylaminopropyl)-5-hydroxydibenzo[a,e]cycloheptatriene in 30 ml. of glacial acetic acid was cooled in an ice-bath and saturated with dry hydrogen chloride. Acetic anhydride, 8.21 g. (0.06 mole) was added and the solution heated for ½ hour on the steam-bath. The solution was cooled to room temperature, treated with 25 ml. of water, cooled in an ice bath and covered with 50 ml. of benzene. The mixture then was made basic with 75 ml. of 10 N sodium hydroxide, the benzene layer separated and the aqueous layer extracted with two 25 ml. portions of benzene. The combined benzene layers were washed with water and the solution concentrated under reduced pressure to a volume of approximately 50 ml. The solution was cooled in ice and saturated with dry hydrogen chloride. The hydrochloride separated as a syrup that crystallized on scratching. The product was collected, washed with ether and dried in a vacuum desiccator. The product, M.P. 158–204° C., weighed 6.43 g. (93%). A sample was dried over phosphorus pentoxide at 110° C. in vacuo for analysis.

Analysis.— Calcd. for $H_{20}H_{20}ClN \cdot HCl$: C, 69.36; H, 6.11, N, 4.05. Found: C, 69.34; H, 6.43; N, 4.03. This product is a mixture of geometric isomers.

Step E: Separation of the geometric isomers of 3-chloro - 5 - (3-dimethylaminopropylidene)-dibenzo[a,e]cycloheptatriene.—A sample of the hydrochloride of the mixed isomers (M.P. 160–202°) weighing 4.73 g. was crystallized from a mixture of 25 ml. of absolute ethanol and 175 ml. of absolute ether. The hydrochloride of the α form separated as white crystals, M.P. 222–225° (sintered at 208°). The yield was 2.42 g. Two further recrystallizations gave product with a constant melting point of 229.5–230.5° C.

Analysis.—Calcd. for $C_{20}H_{20}ClN \cdot MCl$: C, 69.36; H, 6.11; N, 4.05. Found: C, 69.24; H, 6.22; N, 4.04.

The mother liquors from the first crystallization were evaporated under reduced pressure and the yellow syrupy residue dissolved in water. The solution was made basic with sodium hydroxide and the base extracted into hexane. The extract was washed with water and the solvent evaporated on the steam-bath under reduced pressure. On storing in the dark at room temperature for 15 days some crystals had appeared. On scratching the mass solidified to a slightly oily solid. This material, 1.87 g., was combined with 6.31 g. of crude base obtained in a similar experiment and the combined products were crystallized from 16 ml. of petroleum ether (B.P. 30–60° C.). After cooling to −10° C. the β form was obtained as pale yellow crystals, M.P. 70–74°. The yield was 5.42 g. Recrystallization from alcohol-water followed by recrystallization from petroleum ether gave white crystalline product, M.P. 74–75° C.

Analysis.—Calcd. for $C_{20}H_{20}ClN$: C, 77.53; H, 6.51; N, 4.52. Found: C, 77.36; H, 6.79; N, 4.49.

The base of the β isomer, 1.05 g. was dissolved in 10 ml. of absolute ethanol. Maleic acid, 0.415 g. was dissolved in this solution and absolute ether added to incipient turbidity, 20 ml. being required. The product was collected and recrystallized from an absolute alcohol-ether mixture. The hydrogen maleate of 3-chloro-5-(3-dimethylaminopropylidene) - dibenzo[a,e]cycloheptatriene melted at 157–158° C.

Analysis.—Calcd. for $C_{20}H_{20}ClN \cdot C_4H_4O_4$: C, 67.69; H, 5.68; N, 3.29. Found: C, 67.65; H, 5.80; N, 3.29.

EXAMPLE III 5-(3-dimethylamino-2-methylpropylidene)-dibenzo[a,e]cycloheptatriene Step A: Prepartion of 3-dimethylamino-2-methylpropylmagnesium chloride.—The Grignard reagent was prepared from 2.43 g. (0.1 mole) of magnesium and 13.56 g. (0.1 mole) of 3-dimethylamino-2-methylpropyl chloride in 100 ml. of dry tetrahydrofuran employing ethyl magnesium bromide as initiator and following essentially the procedure of Example I, Step A.

Step B: Preparation of 5-(3-dimethylamino-2-methylpropyl) - 5 - hydroxydibenzo[a,e]cycloheptatriene.—Dibenzo[a,e]cycloheptatriene-5-one, 10.6 g. (0.05 mole) was added in portions to the Grignard reagent obtained in Step A while maintaining the temperature at 5–10° C. The mixture was stirred for 1 hour at room temperature and the bulk of the solvent distilled at 40–50° C. under reduced pressure. The residue was hydrolysed and extracted with benzene as described in Example 1, Step B. The combined benzene extracts were extracted with three 30 ml. portions of 2 N hydrochloric acid followed by two 50 ml. portions of water. A solid separated in the acid extract. The combined aqueous extracts were made basic with 20 ml. of 10 N sodium hydroxide. A cream colored solid separated. The mixture was extracted with four 100 ml. portions of benzene. Evaporation of the benzene gas 15.0 g. (97.5%) of crystalline product, M.P. 186–188° C. Crystallization from n-propyl alcohol gave 12.5 g. (81.5%) of product, M.P. 189–190°, unchanged by a further recrystallization.

Analysis.—Calcd. for $C_{21}H_{25}NO$: C, 82.04; H, 8.20; N, 4.56. Found: C, 82.09; H, 8.31; N, 4.51.

Step C: Preparation of 5-(3-dimethylamino-2-methylpropylidene)-dibenzo[a,e]cycloheptatriene.—5 - (3 - dimethylamino-2-methylpropyl) - 5 - hydroxydibenzo[a,e]cycloheptatriene (3.0 g., 0.0098 mole) and acetic anhydride (25 g., 0.24 mole) were heated to refluxing of 1 hour. Water, 50 ml., was added cautiously to the boiling mixture. The mixture was cooled and made basic with sodium hydroxide. The product was extracted with benzene. Evaporation of the benzene left 2.68 g. (95%) of the viscous oily base. The product was dissolved in absolute alcohol and treated with a slight excess of hydro-

7 gen chloride in anhydrous alcohol. On diluting the solution with ether the hydrochloride of the product was precipitated in a yield of 2.6 g. (82%) of material, M.P. 209–210° C. Recrystallization from a mixture of n-propyl alcohol and absolute ether gave product, M.P. 209.6–210.6° C.

Analysis.—Calcd. for $C_{21}H_{23}N \cdot HCl$: C, 77.40; H, 7.42; N, 4.30; Cl, 10.88. Found: C, 77.00; H, 7.32; N, 4.24; Cl, 10.84.

EXAMPLE IV 3-chloro-5-[3-(1-methyl-4-piperazinyl)-propylidene] dibenzo[a,e]cycloheptatriene Step A: Preparation of 3-(1-methyl - 4 - piperazinyl)-propylmagnesium chloride.—A solution of 15 g. (0.085 mole) of 4-(3-chloropropyl)-1-methylpiperazine in 75 ml. of tetrahydrofuran was prepared. In an effort to prepare the Grignard reagent from this solution it was discovered that the solution contained traces of water. The solution was dried over calcium hydride and added dropwise to a stirred and refluxing mixture of 1.22 g. (0.05 mole) of magnesium turnings in 10 ml. of tetrahydrofuran that had previously been treated with 0.55 g. of ethyl bromide. After stirring at reflux for 1½ hours all of the magnesium had dissolved.

Step B: Preparation of 3-chloro-5-hydroxy - 5 - [3 - (1-methyl-4-piperazinyl) - propyl] - dibenzo[a,e]cycloheptatriene.—The solution of the Grignard reagent prepared in Step A was cooled in an ice bath and stirred while 14.4 g. (0.06 mole) of 3 - chlorodibenzo[a,e]cycloheptatrienone was added in portions over a period of 15 minutes. The reaction mixture then was stirred for one hour at room temperature and the product isolated following essentially the method of Example III, Step B. On making the acid extract basic the product separated as a gum that crystallized readily. After washing with water and air drying at room temperature the product, M.P. 134–136° weighed 9.81 g. Recrystallization from a mixture of isopropyl alcohol and water gave product M.P. 137.5–139° C.

Analysis.—Calcd. for $C_{23}H_{27}ClN_2O$: C, 72.15; H, 7.11; N, 7.32. Found: C, 71.94; H, 7.26; N, 7.28.

Step C: 3-chloro-5-[3-(1-methyl - 4 - piperazinyl) - propylidene] - dibenzo[a,e]cycloheptatriene.—A solution of 7.1 g. (0.0185 mole) of 3-chloro-5-hydroxy-5[3-(1-methyl-4-piperazinyl) - propyl] - dibenzo[a,e]cycloheptatriene in 30 ml. of glacial acetic acid was cooled and saturated with dry hydrogen chloride. Acetic anhydride (5.7 g., 0.056 mole) was added and the solution was warmed on the steam-bath for 40 minutes. The solution was cooled, diluted with water, covered with 50 ml. of benzene and made basic with sodium hydroxide. The benzene layer was separated, the aqueous layer extracted with three successive 20 ml. portions of hexane and the combined extracts washed with water. Evaporation of the solvent left 6.75 g. of the oily yellow base.

A 4.73 g. (0.013 mole) portion of the base and 3.2 g. (0.026 mole) of maleic acid were dissolved in 50 ml. of 95% alcohol. The dimaleate salt was obtained in a yield of 7.1 g., M.P. 187–189° C. Recrystallization from water did not change the M.P., but subsequent recrystallization from 95% ethyl alcohol gave a product having a melting point 189–191° C.

Analysis. — Calcd. for $C_{23}H_{25}ClN_2 \cdot 2(C_4H_4O_4)$: C, 62.34; H, 5.57; N, 4.69. Found: C, 62.48; H, 5.64; N, 4.67.

EXAMPLE V 3,7-dichloro-5-(3-dimethylamino-propylidene)-dibenzo[a,e]cycloheptatriene Step A: 3-dimethylaminopropylmagnesium chloride is prepared as described in Example I, Step A.

Step B: By substituting the chemically equivalent quantity of 3,7-dichlorodibenzo[a,e]cycloheptatriene-5-one for the dibenzo[a,e]cycloheptatrienone of Example I, Step B and following essentially the procedure of Example I, Step B 3,7-dichloro-5-(3-dimethylamino-propylidene)-5-hydroxydibenzo[a,e]cycloheptatriene is obtained. The 3,7-dichlorodibenzo[a,e]cycloheptatriene-5-one can be prepared from the known 3,7 - diaminodibenzo[a,e]cycloheptatriene-5-one by replacement of the amino groups by chlorine according to known methods.

Step C: By substituting the product obtained in Step B for the 3-chloro-5-(3-dimethylaminopropyl) - 5 - hydroxydibenzo[a,e]cycloheptatriene of Example II, Step C and following essentially the procedure of Example II, Step C, 3,7-dichloro-5-(3 - dimethylaminopropylidene) - dibenzo [a,e]cycloheptatriene is obtained.

What is claimed is:

1. A compound having the structure:

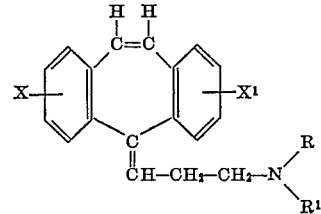

in which X and $X^1$ are selected from the group consisting of hydrogen, chlorine, bromine, fluorine, trifluoromethyl, lower alkyl having up to four carbons, lower alkoxy having up to four carbons and phenyl, and

is selected from the group consisting of di-loweralkylamino each alkyl having up to four carbons, 1-piperidyl, 1-pyrrolidyl, 4-morpholinyl and a 1-lower-alkyl-4-piperazinyl the alkyl moiety having up to four carbons.

2. A compound having the structure:

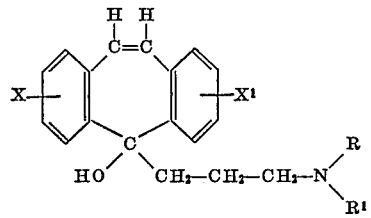

in which X and $X^1$ are selected from the group consisting of hydrogen, chlorine, bromine, fluorine, trifluoromethyl, lower alkyl having up to four carbons, lower alkoxy having up to four carbons and phenyl, and

is selected from the group consisting of diloweralkylamino each alkyl having up to four carbons, 1-piperidyl, 1-pyrrolidyl, 4-morpholinyl and a 1-lower alkyl-4-piperazinyl the alkyl moiety having up to four carbons.

3. The compound: 5-(3-dimethylaminopropyl)-5 - hydroxydibenzo[a,e]cycloheptatriene.

4. The compound: 5-(3 - dimethylaminopropylidene)-dibenzo[a,e]cycloheptatriene.

5. The compound: 3-chloro-5-(3 - dimethylaminopropyl)-5-hydroxydibenzo[a,e]cycloheptatriene.

6. The compound: 3-chloro-5-(3 - dimethylaminopropylidene)-dibenzo[a,e]cycloheptatriene.

7. The β form of 3-chloro-5-(3 - dimethylaminopropylidene-dibenzo[a,e]cycloheptatriene and melting at 74–75° C.

References Cited

UNITED STATES PATENTS

| | | | |
|---|---|---|---|
| 2,403,483 | 7/1946 | Cusie | 260—570.8 |
| 2,649,444 | 8/1953 | Barrett | 260—570.5 |
| 2,873,275 | 2/1959 | Rumsden | 260—570.5 |

FOREIGN PATENTS 627,139   7/1949   Great Britain.

OTHER REFERENCES

Battersby et al.: Jour of the Chem. Soc. (London), pp. 2888–2900 (1955).

Bergmann et al.: Bull. Soc. Chem., France Ser. 5T18, pp. 684–692 (1951).

ROBERT V. HINES, *Primary Examiner.*

U.S. Cl. X.R.

260—239, 240, 247, 247.7, 268, 293, 294.7, 326.5, 501.1, 501.18, 583; 424—248, 250, 267, 274, 330